United States Patent
Chen et al.

(10) Patent No.: US 9,959,104 B2
(45) Date of Patent: *May 1, 2018

(54) DEPENDENCY-BASED CONTAINER DEPLOYMENT

(71) Applicant: International Business Machines Corporation, Armonk, NY (US)

(72) Inventors: Xiao Long Chen, Beijing (CN); David L. Kaminsky, Chapel Hill, NC (US); Xi Ning Wang, Beijing (CN); Zhe Yan, Beijing (CN); Zheng Zhao, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/142,493

(22) Filed: Apr. 29, 2016

(65) Prior Publication Data
US 2017/0052772 A1     Feb. 23, 2017

Related U.S. Application Data

(63) Continuation of application No. 14/828,564, filed on Aug. 18, 2015.

(51) Int. Cl.
 *G06F 9/44*    (2006.01)
 *G06F 9/445*   (2018.01)

(52) U.S. Cl.
 CPC .......... *G06F 8/60* (2013.01); *G06F 9/44521* (2013.01)

(58) Field of Classification Search
 CPC .......... G06F 8/60; G06F 8/65; G06F 11/1433
 See application file for complete search history.

(56) References Cited

U.S. PATENT DOCUMENTS

| | | | | |
|---|---|---|---|---|
| 2004/0003266 | A1* | 1/2004 | Moshir | G06F 8/65 713/191 |
| 2004/0068553 | A1* | 4/2004 | Davis | H04L 67/16 709/218 |
| 2004/0205101 | A1* | 10/2004 | Radhakrishnan | G06F 9/5016 709/200 |

(Continued)

FOREIGN PATENT DOCUMENTS

| | | |
|---|---|---|
| CA | 2878759 A1 | 3/2015 |
| CN | 104008002 A | 8/2014 |

(Continued)

OTHER PUBLICATIONS

Appendix P.: List of IBM Patents or Patent Applications Treated as Related, dated Apr. 29, 2016, 2 pages.

(Continued)

*Primary Examiner* — Duy Khoung T Nguyen
(74) *Attorney, Agent, or Firm* — Daniel R. Simek

(57) ABSTRACT

Embodiments of the present invention relate to a method, device and computer program product for container deployment. By comparing the target libraries required by a target container to be deployed and the libraries that have been loaded on the candidate hosts, the costs of deploying the target container on the candidate hosts can be estimated. Then a target host is selected from among the plurality of candidate hosts based on the determined costs.

14 Claims, 6 Drawing Sheets

(56) References Cited

U.S. PATENT DOCUMENTS

| | | | | |
|---|---|---|---|---|
| 2008/0154805 A1* | 6/2008 | Gurumoorthy | ......... | G06F 9/505 706/12 |
| 2009/0222560 A1* | 9/2009 | Gopisetty | ................ | G06F 8/60 709/226 |
| 2015/0082298 A1* | 3/2015 | Wang | ........................ | G06F 8/60 717/174 |
| 2015/0301814 A1* | 10/2015 | Chen | ........................ | H04L 67/10 717/177 |
| 2016/0026442 A1* | 1/2016 | Chhaparia | ............... | G06F 21/31 717/139 |
| 2016/0269319 A1* | 9/2016 | Wise | ..................... | H04L 47/823 |
| 2016/0357451 A1* | 12/2016 | Chen | ..................... | G06F 3/0611 |

FOREIGN PATENT DOCUMENTS

| | | | |
|---|---|---|---|
| CN | 104239159 A | 12/2014 | |
| CN | 104350460 A | 2/2015 | |
| CN | 104767741 A | 7/2015 | |

OTHER PUBLICATIONS

U.S. Appl. No. 14/828,564, entitled "Dependency-Based Container Deployment", filed Aug. 18, 2015.

Scheepers, Mathijs Jeroen, "Virtualization and Containerization of Application Infrastructure: A Comparison", 21st Twente Student Conference on IT, Jun. 23, 2014, pp. 1-7.

"Docker Provisioner", Vagrant Documentation, 2015, pp. 1-12, HashiCorp, <http://docs.vagrantup.com/v2/provisioning/docker.html>.

Dua, Rajdeep et al., "Virtualization vs Containerization to support PaaS Cloud Engineering" (IC2E), 2014 IEEE International Conference on Mar. 14, 2014, Abstract.

PCT International Search Report, PCT/CN2016/092780, International Filing Date Aug. 2, 2016 and Written Opinion of the International Searching Authority.

* cited by examiner

500 →

```
# ADD THE FILES WE REQUIRE, JAR + WLP FILES
ADD wlp-developers-extended-8.5.5.2.jar /root/
ADD wlp-developers-runtime-8.5.5.2.jar /root/
ADD JAXWSEJBSample.jar /root/

# INSTALL WLP
RUN apt-get update
RUN apt-get install -y default-jre
RUN java -jar /root/wlp-developers-runtime-8.5.5.2.jar --acceptLicense /root/
RUN java -jar /root/wlp-developers-extended-8.5.5.2.jar --acceptLicense /root/
RUN cd /root/wlp && java -jar ../JAXWSEJBSample.jar /root/wlp EXPOSE 9080
CMD /root/wlp/bin/server run JAXWSEJBSample
```

FIG. 5

```xml
<registry>
    <host id="A" address="9.110.179.27">
        <container id="A_a" image_id="imageA">
            <layer id="A_a_1" category=" rdbms ">
                download/install  rdbms  11.7
            </layer>
            <layer id="A_a_2" category=" appserver ">
                download/install  appserver 8.0
            </layer>
            <layer id="A_a_3" category=" log ">
                download/install  log  12.6.1
            </layer>
            <layer id="A_a_4" category=" model ">
                download/install  model  10.2.1
            </layer>
        </container>
        <container id="A_b" image_id="imageB">
            <layer id="A_b_1" category=" db ">
                download/install  db  10.1
            </layer>
            <layer id="A_b_2" category=" appserver ">
                download/install appserver 8.5.5.5
            </layer>
            <layer id="A_b_3" category=" bus ">
                download/install bus  9.0
            </layer>
        </container>
    </host>
    <host id="B" address="9.112.79.23">
        <container id="B_a" image_id="imageC">
            <layer id="B_a_1" category=" rdbms ">
                download/install  rdbms  11.7
            </layer>
            <layer id="B_a_2" category=" appserver ">
                download/install appserver 8.5.5.5
            </layer>
            <layer id="B_a_3" category="statistic">
                download/install statistic 17
            </layer>
            <layer id="B_a_4" category=" model ">
                download/install  model  10.2
            </layer>
        </container>
    </host>
</registry>
```

FIG. 7

DEPENDENCY-BASED CONTAINER DEPLOYMENT

BACKGROUND

Virtual machines (VMs) are widely used to create virtualization. VMs operate based on the computer architecture and functions of a real or hypothetical computer. A VM is a software implementation of a machine that executes programs like a physical machine. A single physical machine may support multiple VMs executed thereon and manage these VMs using a program called "hypervisor." Traditional VM architecture causes resource waste because a guest operating system (OS) has to be deployed for each VM.

Containers provide lightweight virtualization that allows for isolating processes and/or resources without the need of providing instruction interpretation mechanisms and/or other complexities of full virtualization. Container technology, such as Linux Container (LXC), provides lightweight virtualization that allows isolating processes and resources without the need to provide instruction interpretation mechanisms and other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries.

Docker is an open-source project that automates the deployment of applications inside software containers by providing an additional layer of abstraction and automation of operating-system-level virtualization on Linux. (Note: the term(s) "Docker" and "Linux" may be subject to trademark rights in various jurisdictions throughout the world and are used here only in reference to the products or services properly denominated by the marks to the extent that such trademark rights may exist.) Docker uses resource isolation features of the Linux kernel such as cgroups and kernel namespaces to allow independent "containers" to run within a single Linux instance, avoiding the overhead of starting and maintaining virtual machines.

SUMMARY

In general, example embodiments of the present invention include a method, device and computer program product for container deployment.

In an aspect, a computer-implemented method is provided. According to the method, first information and second information are obtained. The first information indicates target libraries required by a target container to be deployed, and the second information indicates libraries that have been loaded for at least one container deployed on a plurality of candidate hosts. Costs of deploying the target container on the plurality of candidate hosts are then determined based on the first information and the second information. A target host is selected from among the plurality of candidate hosts based on the determined costs, such that the target container is deployed on the selected target host.

In another aspect, a device is provided. The device comprises a processing unit and a memory coupled to the processing unit and storing instructions thereon. The instructions, when executed by the processing unit, perform the following acts: obtaining first information indicating target libraries required by a target container to be deployed; obtaining second information indicating libraries that have been loaded for at least one container deployed on a plurality of candidate hosts; determining costs of deploying the target container on the plurality of candidate hosts based on the first information and the second information; and selecting a target host from among the plurality of candidate hosts based on the determined costs for deploying the selected target host.

In yet another aspect, a computer program product is provided. The computer program product is tangibly stored on a non-transient machine-readable medium and comprises machine-executable instructions. The instructions, when executed on a device, cause the device to obtain first information indicating target libraries required by a target container to be deployed; obtain second information indicating libraries that have been loaded for at least one container deployed on a plurality of candidate hosts; determine costs of deploying the target container on the plurality of candidate hosts based on the first information and the second information; and select a target host from among the plurality of candidate hosts based on the determined costs for deploying the target container.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 5 is a screenshot of an example dockerfile in accordance with embodiments of the present invention;

FIG. 7 is a screenshot of a file acting as the container/image information in accordance with the present invention.

Throughout the drawings, the same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
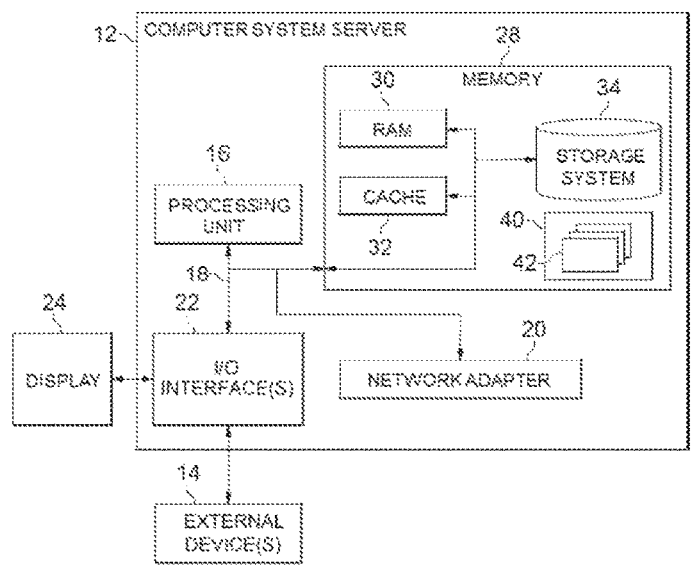
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Some example embodiments of the dependency-based container deployment will be described in the following paragraphs. In accordance with embodiments of the present invention, when deploying a new container, the dependencies of the libraries required by the new containers and those which have been loaded on the candidate hosts are taken into consideration. Generally speaking, the new container is deployed to a host that has already loaded the required libraries as many as possible. By reducing or eliminating the computational overhead caused by additional libraries, the deployment cost can be minimized. In some embodiments, it is possible to select the target host further based on other relevant factors such as characteristics of the libraries, workload of the hosts, one or more other containers to be deployed, or the like.

In the following descriptions, principles of the present invention will be described with reference to embodiments where the containers are deployed based on templates. However, it is to be understood that template-based container deployment is only an example mechanism, without suggesting any limitation as to the scope of the invention. In alternative embodiments, the containers may be deployed by any other appropriate mechanisms.

Figure 2:
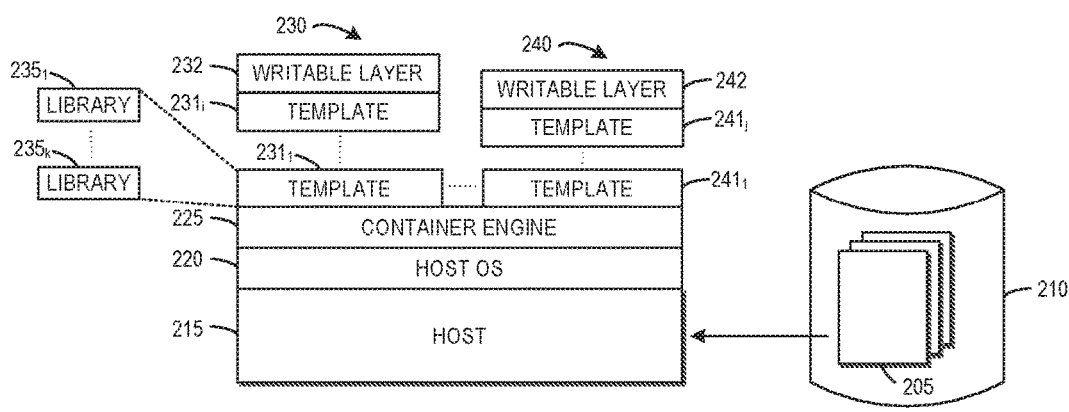
FIG. 2 is a schematic diagram of template-based container deployment in accordance with embodiments of the present invention.

FIG. 2 shows a schematic diagram of template-based container deployment. One or more templates 205 may be created in advance. A template may contain information that can be used to deploy and build a container. For instance, a template may contain an operating system with a web application installed. The specific parameter values and/or configurations such as networking configuration will be instantiated when the template is deployed on a host. By way of example, for Docker containers, the templates 205 are called "images." (Note: the term(s) "Docker" may be subject to trademark rights in various jurisdictions throughout the world and are used here only in reference to the products or services properly denominated by the marks to the extent that such trademark rights may exist.) The templates 205 may be uploaded and stored in a registry 210. While reference is made throughout this document to Docker and Docker-specific elements, it should be understood that aspects of the present invention may be applied equally to other automated programs where container deployment is practiced.

The templates 205 may be provisioned to a host 215 and instantiated on the host OS 220 executed on the host 215. A container engine 225 executes on the host OS 220 in order to manage and control the containers. A host 215 may include one or more containers 230 and 240, each of which is built based on one or more templates. For some containers such Docker containers, the templates are read-only images. The instantiation of a template 205 is done by creating a writable layer on the top of the template. For example, as shown in FIG. 2, the writable layers 232 and 242 are created to build the containers 230 and 240, respectively.

A template may reference to one or more templates which can be referred to "parent templates." The underlying template that has no parent template is referred to as "base template." In the example shown in FIG. 2, the container 230 involves templates $231_1 \ldots 231_i$, and the container 240 involves templates $241_1 \ldots 241_j$. In this way, a container may be defined by the writable layer, its corresponding template together with information about the parent templates (if any) and additional information such as a unique identifier, networking configuration, resource allocations, and the like.

Generally speaking, in deploying a template, one or more libraries need to be loaded on the host 215. In a Docker container, the libraries may be arranged in layers and thus each library for a template may be considered as a layer. For instance, as shown in FIG. 2, the template $231_1$ contains libraries/layers $235_1 \ldots 235_k$. Different containers/templates may share one or more common libraries. In this way, the libraries/layers may define the dependencies of different containers/templates. In accordance with embodiments of the present invention, such dependencies are used to achieve efficient deployment of new containers.

Figure 3:
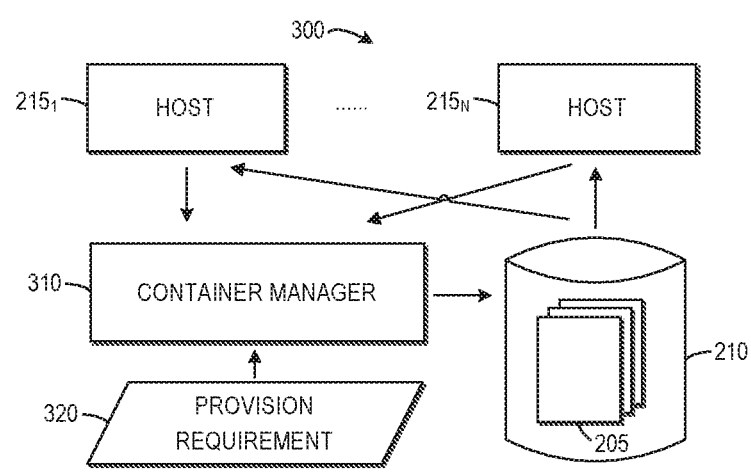
FIG. 3 is a block diagram of an environment in which embodiments of the present invention cam be implemented.

FIG. 3 shows a block diagram of an environment 300 in which embodiments of the present invention may be implemented. As shown, in the environment 300, there are multiple candidate hosts $215_1, \ldots, 215_N$ (collectively referred to as "hosts 215"). Each of the candidate hosts 215 includes at least one container that has already deployed thereon. A container manager 310 controls the deployment of containers. In some embodiments, the container manager 310 may be implemented by the computer system/server 12 as described above with reference to FIG. 1, for example.

In case that a container (referred to as "target container") is to be built, the container manager 310 selects an appropriate host from among the candidate hosts 215. To this end, the container manager 310 determines the libraries (referred to as "target libraries") that are required by the target container. In some embodiments, this can be done by analyzing the provision requirement 320 for the target container. For example, in those embodiments where the template-based container deployment is used, the container manger 310 may first determine the template(s) for deploying the target container and then determine the libraries for the template(s). The container manager 310 further collects configuration information of the containers deployed on the candidate hosts 215. The configuration information at least indicates the libraries that have been loaded on each of the candidate hosts 215.

Based on the collected information, the container manager 310 determines the cost of deploying the target container on each of the candidate hosts 215 at least in part based on the dependency between the target container and the existing libraries. The container manager 310 then selects an appropriate host to deploy the target container such that the deployment cost is minimized. Ideally, if there is a host 215 that has already loaded all the target libraries required by the target container, then the deployment would be very efficient.

Figure 4:
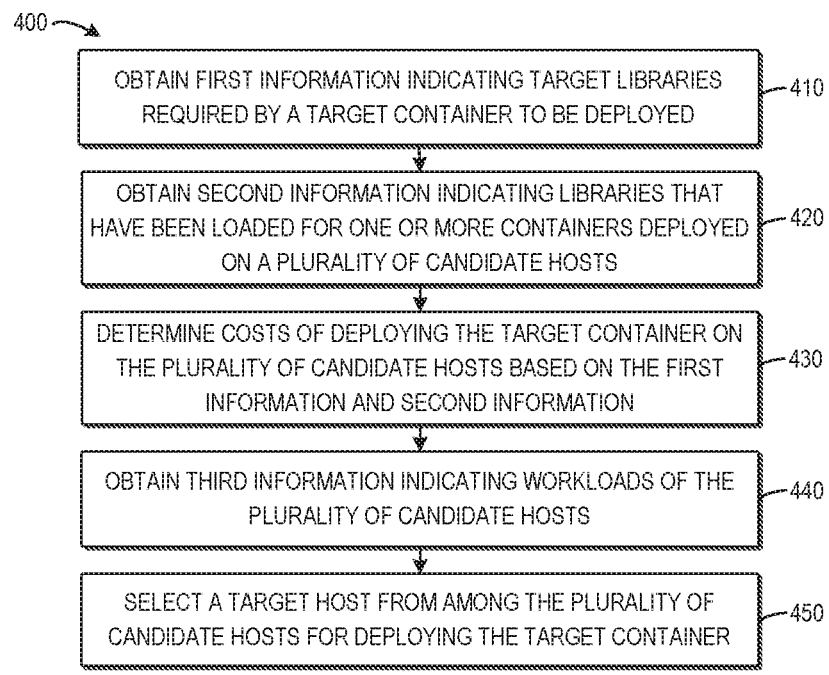
FIG. 4 is a flowchart of a method for container deployment in accordance with embodiments of the present invention.

FIG. 4 shows a flowchart of a method 400 for container deployment in accordance with embodiments of the present invention. The method 400 may be implemented by the container manager 310 as shown in FIG. 3. For example, in those embodiments where the container manager 310 is implemented by computer system/server 12, the processing unit 16 may be configured to carry out the method 400.

As shown in FIG. 4, the method 400 is entered in step 410, where the information indicating the target libraries required by the target container is obtained. For the sake of discussion, the information obtained in step 410 is referred to as "first information." The first information may be obtained in many different ways. For example, in one embodiment, the first information may be derived from the provision requirement and/or any other configuration files for the target container.

Considering Docker technology as an example, a file called "dockerfile" may describe how to build a container and what to execute when the container is running. (Note: the term(s) "dockerfile" may be subject to trademark rights in various jurisdictions throughout the world and are used here only in reference to the products or services properly denominated by the marks to the extent that such trademark rights may exist.) FIG. 5 shows a screenshot of an example dockerfile 500. As known, the dockerfile is readable and maintainable along with the application source code. Therefore, it is possible to determine the target libraries that need to be loaded by analyzing the dockerfile for the target container. It is to be understood that the dockerfile is only an example without suggesting any limitation as to the scope of the invention. The target libraries may be determined by analyzing any other files or metadata related to the target container. In other embodiments, in addition to or instead of the analysis of provision requirement, the target libraries may be expressly specified by the user or obtained in any other ways.

Still in reference to FIG. 4, the method 400 proceeds to step 420, where information indicating libraries that have been loaded for one or more containers on a plurality of candidate hosts 215 is obtained. For the sake of discussion, the information obtained in step 420 is referred to as "second information." In some embodiments, the second information may be collected from each of the candidate hosts 215. For example, in a Docker system, once the containers and/or the configurations thereof change, the host 215 may generate and send a message to a component called "event bus." The message include information about the hardware and/or software configuration of the host, the host OS, the containers that have been deployed, and the like. The container manager 300 may retrieve and analyzes such messages to determine the libraries that have already loaded on each of the candidate hosts 215. Example embodiments in this regard will be discussed in the following paragraphs.

In some embodiments, the second information may be obtained by analyzing the construction history of templates that are used to deploy containers on the candidate hosts 215. Still considering the Docker containers as examples, the dockerfiles used to construct the containers on the candidate hosts 215 are accessible, as described above. These dockerfiles thus maintain a record of the construction history of the containers on the candidate hosts 215. The container manager 310 may retrieve and analyze these dockerfiles in order to determine the libraries that have already been loaded on the candidate hosts 215.

In addition to or instead of collecting the second information from the candidate hosts 215, in some embodiments, the container manager 300 may locally store the information about the loaded libraries. For example, each time a library is loaded on a candidate host 215, the container manager 310 may update the record. In such embodiments, in step 420, the container manager 300 may access its local record to determine the libraries that have been loaded on each of the candidate hosts 215. Other suitable approaches are possible as well.

It is to be understood that although step 410 is shown before step 420, this is merely for the purpose of illustration without suggesting any limitation as to the scope of the invention. The first information does not necessarily have to be collected prior to the second information. In other embodiments, the first and second information can be obtained in a reversed order or in parallel.

Next, in step 430, the costs of deploying the target container on the plurality of candidate hosts 215 are determined based on the first information and the second information. In general, the cost of deploying the target container on any given candidate host 215 is determined at least in part based on the degree of matching between the target libraries to be loaded and the libraries that have been loaded on that candidate target machine. In a further embodiment, one or more other factors may be taken into consideration. As such, the one or more other factors and associated determinations of cost of deploying the target container may be applied on all or at least some of the candidate hosts 215.

In some embodiments, the degree of matching between the target libraries and the libraries on the given candidate host 215 is determined based on the first information and the second information. In accordance with embodiments of the present invention, a library matches another if these two libraries are functionally equal to one another. That is, if an existing library can be reused to function as a target library, it is deemed that the target library has a matching library on the given candidate host 215. For example, if it is determined that a target library has already been loaded on the given candidate host 215, the matching is found. As another example, if one or more existing libraries on the candidate host are functionally equal or similar to a target library, the matching is found as well. Thus, in an embodiment, it is possible to determine the number of target libraries that have matching libraries on the given candidate host 215.

In some embodiments, the cost of loading each target library to the given candidate host is determined. It would be appreciated that the costs of loading different libraries are usually different. For example, some libraries consume more resources (such as computational resources, storage resources, and the like) in the loading process. As another example, different libraries usually have different sizes and therefore consume different network bandwidth resources. The cost of loading a target library may be determined based on its size, CPU (central processing unit) consumption, storage consumption and/or other relevant factors.

Still in reference to FIG. 4, step 430 the cost of deploying the target container on the given candidate host 215 is determined. In another embodiment, the cost is determined based on the degree of matching and the costs of loading the target libraries. It is supposed that the target container involves N target libraries $L_1, L_2 \ldots L_N$ to be loaded, where N represents a natural number. In one embodiment, the cost of deploying the target container on the given candidate host 215 is determined as follows:

$$C=M_1{}^*C_1+M_2{}^*C_2+M_N{}^*C_N;$$

where $M_i=0$ if the target library $L_i$ has a matching library on the given candidate host 215 and $M_i=1$ otherwise ($i=1 \ldots N$), and $C_i$ represents the cost of loading the library $L_i$ to the given candidate host 215.

Alternatively, in other embodiments, the cost of deploying the target container may be determined without considering the costs of loading the individual libraries. For example, in some cases, it is reasonable to assume that the costs of loading different libraries are almost the same. Accordingly, the cost of deploying the target container on the given candidate host 215 may be calculated as follows:

$$C=M_1+M_2 \ldots +M_N$$

Still in reference to FIG. 4, in some embodiments, the method 400 proceeds to step 440 where the information indicating workloads of the plurality of candidate hosts 215 is obtained. For the sake of discussion, the information obtained in step 440 is referred to as "the third information." By way of example, for each of the candidate hosts 215, the third information may indicate one or more of the following: processor usage, memory usage, disk usage, network bandwidth usage, and the like. By comparing the metrics included in the third information with respective thresholds, it is possible to determine whether each candidate host 215 is subject to a heavy burden.

Next, in step 450, a target host is selected from among the plurality of candidate hosts 215. In accordance with embodiments of the present invention, the target host is selected at least in part based on the costs determined in step 430. In general, the target host is selected such that the cost of deploying the target container is low enough (below a threshold). Specifically, in some embodiments, the candidate host 215 for which the cost of deploying the target container can be minimized is selected in step 450 as the target host. In this way, the target container can be deployed efficiently by use of the dependency among the containers/templates. Experiments show that the time consumed by the container deployment can be significantly reduced. For example, for a task of building an image from scratch where conventional approaches take five to ten minutes, an embodiment of the present invention only needs about five seconds.

In some embodiments, the selection of the target host in step 450 may be further based on the workloads of the candidate hosts 215 that are determined in step 440, For example, in some embodiments, the candidate hosts 215 whose workloads exceed a predetermined threshold are first filtered out. That is, the target host is selected from among the remaining candidate hosts having relatively low workloads. Alternatively, in some embodiments, the costs determined in step 430 and the workloads determined in step 440 may be combined to act as metrics for selecting the target host in step 450. Only by way of example, the costs and workloads may be multiplied to act as the metrics. Any other suitable ways are possible as well.

By taking the workloads of the candidate hosts into account, it is possible to avoid deploying the target container on a host that is currently overloaded. That is, there is a tradeoff between the deployment cost and the workload of the host. It is to be understood, however, that the workloads do not necessarily have to be considered. In some embodiments, the target host may be selected solely based on the determined costs, as described above. Moreover, in addition to or instead of the workloads, other characteristics of the candidate hosts 215 may be considered in step 450. Examples of the characteristics include, but are not limited to, performance, security, network domain, manufacturer, or the like.

Moreover, it would be appreciated that sometimes a plurality of containers are to be deployed in a batch. For example, in order to build an application, it may be necessary to deploy multiple containers that cooperate with each other. At this point, in step 450, the target host may be selected based on the total costs of the multiple target containers instead of considering the containers independently. For instance, it is supposed that a first container and a second container are to be deployed. In some embodiments, instead of separately selecting the target hosts, the target host(s) may be selected in step 450 in such a way that the total cost of deploying the first and second containers is below a predetermined threshold or minimized. In this way, the performance of the whole system can be improved.

The target container may be deployed on the target host selected in step 440. Any suitable technology, either currently known or to be developed in the future, can be applied to complete the deployment of the target container. For example, information about the selected target host and any other related information may be organized as provision metadata. The provision metadata may be provided to a provision commander which in turn controls a container deployer to distribute the required templates to the selected target host. By instantiating the templates on the target host, the target container is deployed.

Specifically, in accordance with embodiments of the present invention, two or more containers that are functionally associated with one another might be deployed onto two or more separate hosts. That is, these associated containers are distributed across different hosts. For example, in constructing an Internet-based application, some containers may be deployed on a host that is accessible from outside of the network domain, while the other containers are deployed on a different host that has access to the internal data. In order to deal with such situation, in some embodiments, a bridge component may be deployed to enable data communications between the distributed containers. In one embodiment, the bridge component may be implemented as lightweight container, for example. Alternatively, in another embodiment, the bridge component may be a dedicate component responsible for communication between the associated containers.

Figure 6:
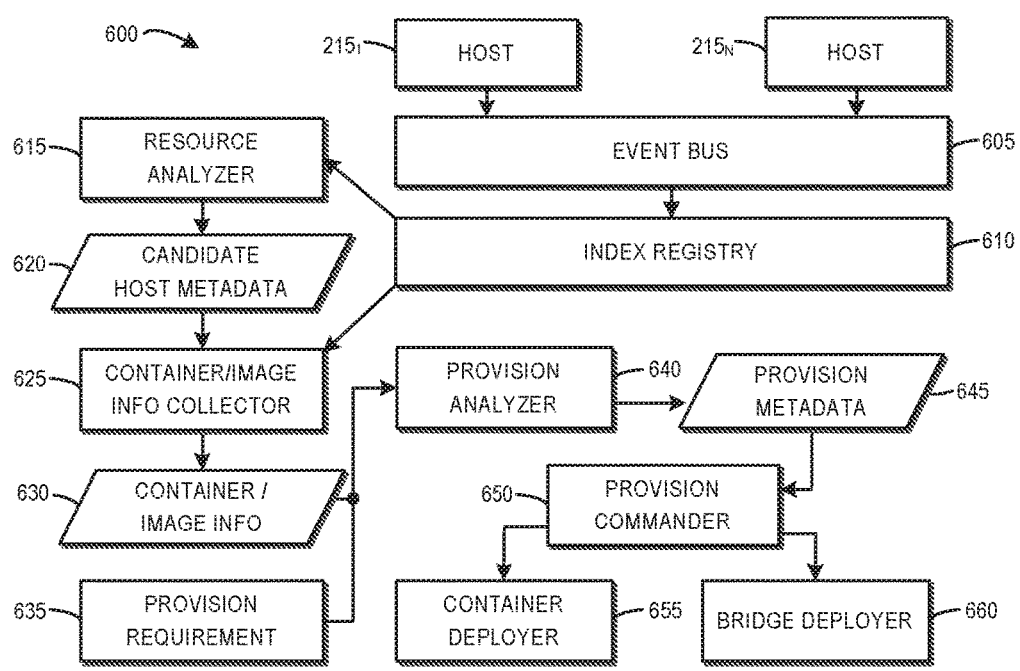
FIG. 6 is a block diagram of a system for container deployment in accordance with the present invention.

FIG. 6 shows a block diagram of a system 600 for container deployment in accordance with the present invention. The containers in the system 600 are Docker containers where the templates are read-only images, as described above. As shown, in this example, the candidate hosts 215$_1$ . . . 215$_N$ are communicatively coupled to an event bus 605. The candidate hosts 215$_1$ . . . 215$_N$ each collect information about the containers/images that have been deployed thereon. Such information is encapsulated into messages that are transmitted to the event bus 605. Transmission of the messages may be triggered by any change on the candidate hosts 215, for example. The event bus 605 stores the messages into an index registry 610. The index registry 610 further stores any other information related to the hosts, containers, container engines, software/hardware configurations, and the like.

A resource analyzer 615 may retrieve information from the index registry 610 and analyze the retrieved information. Results of the analysis are organized as the candidate host metadata 620 which at least indicates the current workload of each candidate host 215, for example. The candidate host metadata 620 is provided into a container/image information collector 625. In some embodiments, based on the candidate host metadata 620, the container/image information collector 625 may filter out those candidate hosts 215 whose workloads exceed a predetermined threshold. For the remaining candidate host 215, the container/image information collector 625 collects, from the index registry 610, the first information that at least indicates the existing libraries or layers on the candidate hosts 215. The first information is organized as the container/image information 630 in this example.

FIG. 7 shows an example of the container/image information 630. In the show example, the container/image information 630 is implemented as an Extensible Markup Language (XML) file 700. The container/image information 630 contains information about two candidate hosts A and B. The host A has two containers, where the container A_a includes four layers and the container A_b includes three layers. The host B has one container B_a which includes four layers.

Returning to FIG. 6, the container/image information 630 and the provision requirement 640 are both provided into a provision analyzer 640. The provision requirement 640 indicates the requirements of the target container(s) to be deployed. In some embodiments, the second information indicating the target libraries/layers may be derived from the provision requirement 640. Based on the input information, the provision analyzer 640 may select an appropriate target host(s) 215, as described above. The information about the selected target host(s) 215 may be stored in provision metadata 645 which can be also implemented as the XML file similar to the file 700 shown in FIG. 7.

The provision metadata 645 is provided into a provision commander 650. The provision commander 650 interprets the provision metadata 645 and controls the container deployer 655 to provide and instantiate the images on the selected target host to deploy the target container. If two or more associated containers are deployed on different hosts, the provision commander 650 may control the bridge deployer 660 to build a bridge component(s) to enable the communications among the deployed containers.

Some embodiments of the present invention are directed to a system and apparatus to provide the efficient container provisioning through dependency analysis among the existing images from different Host OS servers and targeted provisioning requirement. Compared with the prior arts, it has the unique advantage to provide the mechanism to determine the minimal cost across all available servers and build the image there.

In some embodiments of the present invention, the information of all the targeted environments including the host servers, containers, images and their underlying layers can be ingested into the Index Registry, through the event bus based pub/sub mechanism. Resource Analyzer is used to identify the candidate host servers which are available for running the new images. Based on the inspection mechanism, the information of building history for each container or image can be retrieved by the Container/Image Info Collector.

In some embodiments of the present invention, once the user requests one new image, the represented metadata can be used together with all the gathered information above to form the context model. Each artifact which may be container, image, layer, or host server from the context model will be assigned with a cost value. And that cost is incurred if the artifact is not already loaded. Based on the cost calculation and comparison, the final provisioning metadata including the targeted host server's info can be determined.

Further, in some embodiments of the present invention, the Provision Commander populates the provisioning metadata to make the optimized host OS selection. One of The Host OS selection criterion is about the network communication capability between the Host OS servers, which may drive the container provisioning among the cross-host OS servers. According to this situation, the Bridge Deployer can provision the 2 containers on each Host OS server and connect them together.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining first information indicating a set of target libraries utilized by a target container to be deployed;
   determining a plurality of candidate hosts, wherein the plurality of candidate hosts: (i) utilize the same operating system as the target container to be deployed, and (ii) include at least one deployed container that utilizes at least one library in common with the set of libraries utilized by the target container to be deployed;
   obtaining second information indicating a set of libraries that have been loaded for the at least one container deployed on the plurality of candidate hosts;
   determining a cost of deploying the target container on the plurality of candidate hosts based, at least in part, on the first information and the second information;
   selecting a target host from the plurality of candidate hosts based on the cost for deploying the target container wherein:
   the target container is a first container; and
   the target host is a first host selected from among the plurality of candidate hosts; and further comprising:
     deploying the first container to the first host;
     deploying a second container to a second host selected from the plurality of candidate hosts, the second container being associated with the first container, the second host being different from the first host; and
     deploying a bridge component operable to communicate data between the first container and the second container.

2. The computer-implemented method of claim 1, wherein obtaining second information includes:
   analyzing a construction history of a set of templates used to deploy the at least one container on the plurality of candidate hosts.

3. The computer-implemented method of claim 1, wherein determining the cost of deploying the target container includes, for a given candidate host from among the plurality of candidate hosts:
   determining, based, at least in part, on the first information and the second information, a degree of matching between the set of target libraries utilized by the target container and a set of libraries loaded on the given candidate host; and
   determining the cost of deploying the target container on the given candidate host based, at least in part, on the degree of matching between the set of target libraries utilized by the target container and the set of libraries loaded on the given candidate host.

4. The computer-implemented method of claim 3, wherein:
   determining the cost of deploying the target container further includes determining a cost of loading the set of target libraries utilized by the target container to the given candidate host; and
   determining the cost of deploying the target container on the given candidate host is further based, at least in part, on the cost of loading libraries to the given candidate host.

5. The computer-implemented method of claim 4, wherein determining the cost of loading the set of target libraries utilized by the target container to the given candidate host further comprising:
   determining that a cost associated with each library of the set of libraries utilized by the target container is similar;
   in response to determining the cost associated with each library of the set of libraries utilized by the target container is similar within a threshold, determining a value for the difference between a number libraries utilized by the target container and a number of libraries utilized by the target container that have matching libraries on the given candidate host; and
   calculating the cost to load one or more target libraries of the set of target libraries utilized by the target container on the given candidate host, is based at least in part on, a cost associated with a target library utilized by the target container, and the determined value for the difference between a number of libraries with set of libraries utilized by the target container and another number of libraries utilized by the target container that have matching libraries on the given candidate host.

6. The computer-implemented method of claim 4, wherein determining the cost of loading the set of target libraries utilized by the target container to the given candidate host further comprising:
   determining that a cost associated with at least one library of the set of libraries utilized by the target container differs from another cost associated with another library utilized by the target container;
   identifying the cost associated with each library of the set of libraries utilized by the target container; and
   calculating the cost to load one or more target libraries of the set of target libraries utilized by the target container on the given candidate host, is based at least in part on, a cost associated with each target library utilized by the target container that is not already loaded on the given candidate host.

7. The computer-implemented method of claim 4, wherein determining the cost of deploying the target container to the given candidate host is further based on one or more workload metrics associated with the given candidate host.

8. The computer-implemented method of claim 3, wherein a library loaded to the given candidate host matches a target library utilized by the target container, if the library loaded to the given candidate host is functionally equal to the target library utilized by the target container.

9. The computer-implemented method of claim 1, further comprising:
   obtaining third information indicating a set of workloads of the plurality of candidate hosts; and
   wherein selecting the target host is further based, at least in part, on the third information such that a workload from the set of workloads corresponding to the target host is below a predetermined threshold.

10. The computer-implemented method of claim 9:
    wherein the third information associated a given candidate host comprises: one or more workloads respectively associated with the candidate host and one or more metrics corresponding to the one or more workloads respectively associated with the candidate host; and wherein the one or more metrics associated with the workload of the candidate host are associated with respective threshold values.

11. The method of claim 10, wherein the one or more metrics associated with the one or more workloads of the candidate host are selected from the group consisting of processor usage, memory usage, and network bandwidth usage.

12. The method of claim 10, further comprising:
comparing the one or more metrics and the respective threshold values of the one or more metrics corresponding to the one or more workloads of the candidate host to determine a workload burden of the candidate host.

13. The computer-implemented method of claim 9:
wherein selecting the target host from among the plurality of candidate hosts is further based, at least in part, on one or more characterizes of the given candidate host; and
wherein the on one or more characterizes of the given candidate host are selected from the group comprising performance, network domain, and manufacturer.

14. The computer-implemented method of claim 1, further comprising:
determining a cost of deploying a second container on the plurality of candidate hosts; and
wherein:
the target container is a first container; and
selecting the target host includes selecting the target host based, at least in part, on the cost of deploying the first container and the cost of deploying the second container such that a total cost of deploying the first container and the second container is below a predetermined threshold.

* * * * *